United States Patent [19]

Shields

[11] Patent Number: 5,781,596
[45] Date of Patent: Jul. 14, 1998

[54] DESYNCHRONISING VIDEO INFORMATION FROM SYNCHRONOUS NETWORK TO A PLESIOCHRONOUS TRIBUTARY WITH CONSTANT RATE OF CHANGE IN THE LEAK RATE

[75] Inventor: James Alexander Shields, Carrickfergus, Northern Ireland

[73] Assignee: Northern Telecom Limited, Montreal, Canada

[21] Appl. No.: 932,728

[22] Filed: Sep. 17, 1997

Related U.S. Application Data

[63] Continuation of Ser. No. 335,263, Nov. 7, 1994, abandoned.

[30] Foreign Application Priority Data

Nov. 10, 1993 [GB] United Kingdom ............... 9323187
May 24, 1994 [GB] United Kingdom ............... 9410374

[51] Int. Cl.$^6$ ........................................................ H04L 7/00
[52] U.S. Cl. ........................... 375/371; 375/372; 375/376; 395/250; 395/555; 395/558; 395/559
[58] Field of Search ................................. 375/371, 372, 375/376; 395/250, 555, 558, 559

[56] References Cited

U.S. PATENT DOCUMENTS

| | | | |
|---|---|---|---|
| 5,052,025 | 9/1991 | Duff et al. | 375/262 |
| 5,172,376 | 12/1992 | Chopping et al. | 370/100.1 |
| 5,245,636 | 9/1993 | Sari et al. | 375/372 |
| 5,255,293 | 10/1993 | Archer et al. | 375/372 |
| 5,268,935 | 12/1993 | Mediavilla et al. | 375/372 |
| 5,268,936 | 12/1993 | Bernardy | 375/372 |
| 5,276,715 | 1/1994 | Giuseppina et al. | 375/371 |
| 5,285,206 | 2/1994 | Peters et al. | 341/100 |
| 5,311,511 | 5/1994 | Reilly et al. | 370/84 |
| 5,337,334 | 8/1994 | Molloy | 375/372 |
| 5,402,452 | 3/1995 | Powell et al. | 375/372 |
| 5,404,380 | 4/1995 | Powell et al. | 375/363 |
| 5,457,717 | 10/1995 | Bellamy | 375/372 |
| 5,581,493 | 12/1996 | Etienne et al. | 364/724.011 |
| 5,699,391 | 12/1997 | Mazzurco et al. | 375/372 |

*Primary Examiner*—Kenneth S. Kim
*Attorney, Agent, or Firm*—Lee, Mann, Smith, McWilliams, Sweeney & Ohlson

[57] ABSTRACT

The leak rate of the primary buffer in a desynchroniser buffer at the exit from a synchronous transport network to a plesiochronous tributary is controlled in a manner such that the absolute rate of change of leak rate is maintained substantially constant during the periods in which the leak rate is increased or decreased.

4 Claims, 3 Drawing Sheets

DESYNCHRONISING VIDEO INFORMATION FROM SYNCHRONOUS NETWORK TO A PLESIOCHRONOUS TRIBUTARY WITH CONSTANT RATE OF CHANGE IN THE LEAK RATE

This application is a continuation of application Ser. No. 08/335,263, filed Nov. 7, 1994, now abandoned.

This invention relates to a method for controlling leakage of a pointer for a pointer justification event (PJE) at the exit from a synchronous transport network to a plesiochronous tributary when video services are carried on the synchronous network.

BACKGROUND OF THE INVENTION

Broadcast television services have been carried over 140 Mbit digital line systems based on the plesiochronous hierarchy. Line transmission may be optical or electrical using the coded mark inversion (CMI) coding scheme on electrical interfaces, and a variety of proprietary schemes over optical links. Standardisation of the optical interfaces led to first the Synchronous Optical Network standard (SONET) in America and followed by the Synchronous Digital Hierarchy (SDH) in the rest of the world. This SDH standard provides an interface to all the previous plesiochronous digital line rates including the 140 Mbit system used for broadcast video.

As the new standard becomes widely deployed, increasing numbers of optical transport services at 140 Mbit will be carried entirely or in part over 155 Mbit synchronous optical links. The mechanism of justifying frequency offsets within the SDH network introduces phase quanta at the point of exit for the 140 Mbit signal. Where this 140 Mbit line is carrying video services, excessive phase disturbance during justification events have been found to compromise colour sub carrier jitter standards.

SDH Overview

The synchronous system allows for the transport of information in a frame comprising of a fixed number of rows and columns, and some bytes used for identifying the position of the information. The information is mapped into a container and overhead bytes are added to carry quality of signal, signal type, and other information which is carried with the payload until the point where it is extracted from the container. The container with its path overhead (POH) is called a virtual container, and in the case of a 140 Mbit signal this is level 4 within the hierarchy. Thus 140 Mbit information is transported across the synchronous network in VC4s.

A VC4 is created at the point of entry into the SDH network, and is preserved until the point of exit where the information is extracted, or desynchronised. The VC4 may pass through many optical or electrical spans between multiplexers in the network, but the VC4 payload will not be operated on at these nodes, only at the point of entry and exit. The route between these endpoints is referred to as the path. The spans between nodes are referred to as multiplexer sections. The frames carried between multiplexer sections are created and terminated at each multiplexer node. The VC4 must therefore be extracted from a received frame and placed in a new frame for transmission to the following node.

The frames carrying the VC4s are called Administration Units level 4 or AU4s. The position of the VC4 within the AU4 is not fixed. An AU4 has specific bytes within the frame (H1, H2 and H3) which are used to identify, or "point" to the start of the VC4. In this way a continuous stream of AU4s can transport a continuous stream of VC4s which are travelling at a slightly slower or faster rate than the AU4 stream by adjusting the pointer values. For example, when the VC4s are slightly faster than the AU4 rate, the AU4s will have pointers which decrement as the VC4 moves closer to the start of the AU4 frame and through the minimum and across into the next AU4. This process is analogous to having two waveforms on an oscilloscope and triggering to one while the other drifts across the screen. Consider the frozen waveform to represent the AU4 and the VC4 travelling right to left as the other waveform with a slightly higher frequency. If a continuous readout of phase difference between the frozen signal to the moving one was presented, it would decrease from 360° to 0° then start at 360° again as the two pass the point of alignment. Where the analogy breaks down is that the process described is continuous whereas the SDH pointer adjustment is quantised.

Rate Adaptation Processes at a Transport Node ADM

Information arrives in an STM-n frame where n may be 1,4,16 or 64. The higher order frames are byte interleaved lower order frames, so the process is considered at the STM-1 level for clarity. An STM-1 frame is an AU4 with overhead information pertaining to the line and multiplexer sections over which the AU4 has been transmitted. The overhead bytes on the STM-1 frame are first terminated to leave an AU4, then the process of Multiplexer Section Adaptation (MSA) is carried out. This process adjusts the AU4 at the line rate to an AU4 at the node rate and it is here that pointer adjustments take place. Terminating the line rate AU4 involves processing the pointers to find the VC4 and write this at line rate into a buffer. The node then reads from the buffer at the node rate into a new AU4. If the line and node rate are identical, the buffer fill will be static, and the pointers in the node AU4 will be at a fixed offset to the line AU4. If however the rates are different, the buffer will either increase or decrease fill and the node AU4 will carry out a "pointer justification" to recenter the buffer. This process is best examined by way of example.

A negative pointer justification event occurs when an incoming line rate exceeds the node rate at the ADM multiplexer node. The MSA process at the node writes the VC4 to a buffer and the node reads into a rate adapted AU4. The difference in rates gives rise to an increasing fill in the VC4 buffer, and this situation develops until a threshold fill is reached which triggers a pointer justification. A key feature of the frequency justification mechanism of the SDH network standard is therefore the packaging of phase offsets into 3 byte quanta which propagate across the network as pointer justification events (PJEs).

A pointer justification event corresponds in the worst case to 24 bits of information arriving at a desynchroniser in one frame. These 24 bits are extra or less, depending on whether the pointer was positive or negative. This pointer must be leaked into the network through the desynchroniser in a manner that will not compromise the jitter specifications of the signals. In particular, the PAL video service may be carried on a 140 Mbit tributary where the video codec passes phase information through to the reconstituted analogue signal. In this situation, if a pointer justification is leaked too quickly into the codec, some components of the video signal will be excessively jittered. The leak rate may be controlled to prevent this, but a contention occurs between the arrival rate of pointer justification events, and the time taken to clear these from the desynchroniser buffers. This invention provides a method of leak rate control to meet the limits of jitter tolerable in the video service. Additionally it provides an alarm threshold when the network PJE arrival rate exceeds that which can be fed into the network without compromising video jitter standards.

Summary of SDH Effect on Signal Phase for PAL TV Services

Video codecs are used to take component, or PAL composite video signals and digitise these to continuous bit streams. The codec may operate by either providing a bit stream at one of the Plesiochronous digital hierarchy rates, 2, 8, 34 or 140 Mbit, or by directly mapping the digital information into a synchronous container using a proprietary mapping scheme to provide a port on the codec for interface to the SDH network at STM1, STM4 etc.

Within the coding methodologies for compressing the full bandwidth PAL composite signal into the transport interface, there exists non linear and linear coding components. Linearly encoded components of the PAL signal inherit phase noise from the transport network and pass this through the decoder into the reconstituted video signal. The colour sub carrier of a PAL video signal is particularly sensitive to phase modulation, in that the accepted limit of phase stability is 0.1 Hz per second at the 4.43 MHz frequency of the carrier.

The SDH network accommodates frequency offsets between Transport Nodes by carrying out pointer justifications. These represent phase quanta of 3 bytes. The previous standard of digital transmission carried out phase justification on single bit quanta. Therefore the SDH transport network in effect carries out fewer justifications which are of larger amplitude. Controlling the flow of this phase information into the reconstituted bitstream, produces modulation of the phase content in the low end of the spectrum, below 10 Hz. This low frequency phase modulation is passed directly through video codecs on linearly encoded components, and on to the reconstituted analogue video. Thus the colour sub carrier jitter can be excessive. The parameter, within the video service, of interest is the colour sub carrier. This component has an associated jitter limit of 0.1 Hz/s at 4.43 MHz. Thus the digital information delivered from the synchronous network must not give rise to a deviation in the 4.43 MHz component of greater than 0.1 Hz. From a 140 Mbit service this corresponds to 3.11 bits of information in a 1 second interval.

In general at the point of exit from the SDH network, the information transmission frequency is reconstituted from the rate of arrival of the information in the virtual containers. However due to the pointer frequency compensation mechanism, the rate of arrival of information has superimposed phase quanta. The process of reconstituting the information transmission rate is called de synchronisation.

SUMMARY OF THE INVENTION

According to the present invention there is provided a method of modulating the leak rate of a primary buffer in a desynchroniser buffer at the exit from a synchronous transport network to a plesiochronous tributary in a manner such that the absolute rate of change of leak rate is substantially constant throughout time periods in which the leak rate is increased or decreased.

According to another apect of the invention there is provided an arrangement for controlling the leak rate of a primary buffer in a desynchroniser buffer at the exit from a synchronous transport network to a plesiochronous tributary, the arrangement including means for modulating the leak rate of the primary buffer in a manner such that the absolute rate of change of leak rate is substantially constant throughout time periods in which the leak rate is increased or decreased.

The method controls the rate of change of leak rate rather than the leak rate itself. This parameter is the key to maintaining the jitter in the downstream network to a minimum while ensuring maximum rate of clearance of arriving pointers.

As each pointer justification event contains a finite number of information bits these will be cleared from the buffer by leaking with a rate that increases then decreases to pass the information content into the network without compromising the network phase specifications. The rate of increase and decrease in leak rate will be governed by the arrival rate of PJEs and this provides an improvement over a linear relationship, as a greater amount of information is transferred through the desynchroniser while maintaining the output jitter at a constant rate.

The formal relationship is described below, where Pr is the pointer justification arrival rate and Lr is the bit leak rate of the desynchroniser.

$$Pr \propto \frac{d}{dt} Lr$$

This equation may be integrated on both sides to give $$Lr = K \oint Pr \, dt$$

The constant of proportionality take the units of $s^{-1}$ and reveals that, as expected, the instantaneous leak rate will be dependent on the amount of extra or deficit information in the desynchroniser buffer.

BRIEF DESCRIPTION OF THE DRAWINGS

An embodiment of the invention will now be described with reference to the accompanying drawings, in which.

DESCRIPTION OF PREFERRED EMBODIMENT

Figure 1:
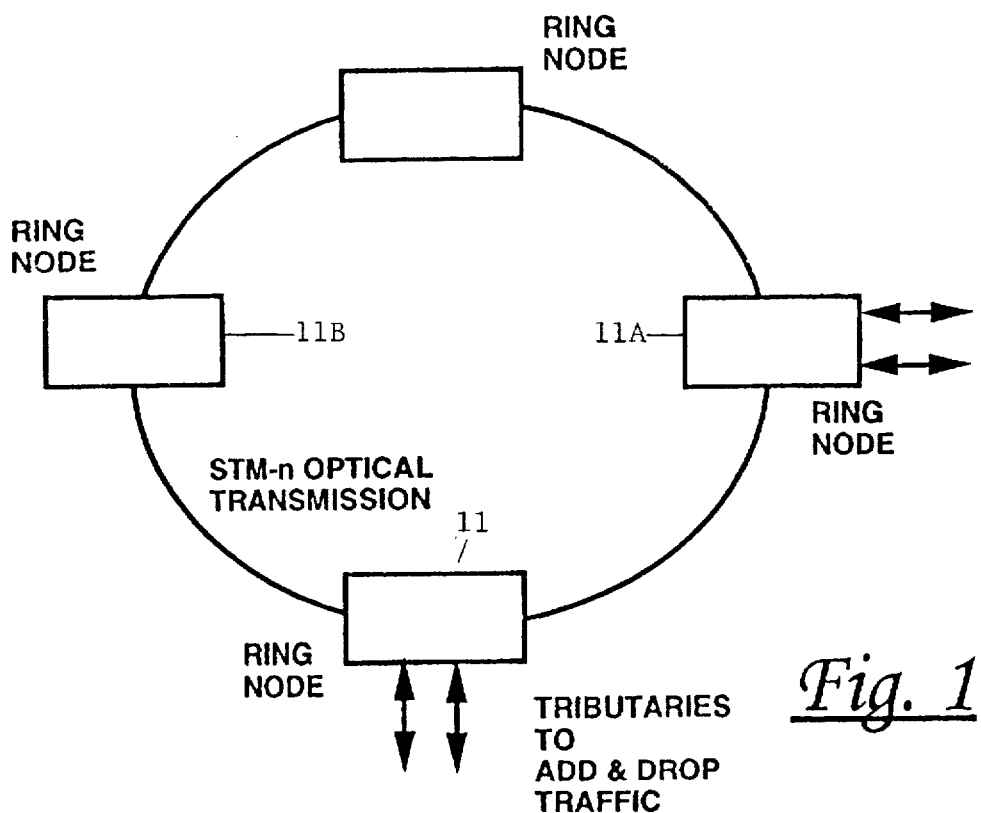
FIG. 1 illustrates a transport node operating as an add/drop node in either a ring or chain of similar nodes forming a network.

Referring to FIG. 1, the processes that take place at a Transport Node operating as an add drop node (ADM) in either a ring or chain of similar nodes forming a network are illustrated schematically. The frames arriving at a node 11 come from adjacent nodes to the east (11A) and west (11B). The rate of transmission on each of these optical lines will be ideally exactly equal, but the standard accommodates variations of up to ±4.6 ppm. Each node may take its synchronisation from either of its optical lines, an internal source, or an external source. A synchronisation strategy is implemented on the network to ensure all nodes are synchronised. However in conditions of less than perfect synchronisation, pointers will be adjusted at nodes in the process of passing through or dropping VC4s.

Figure 2:
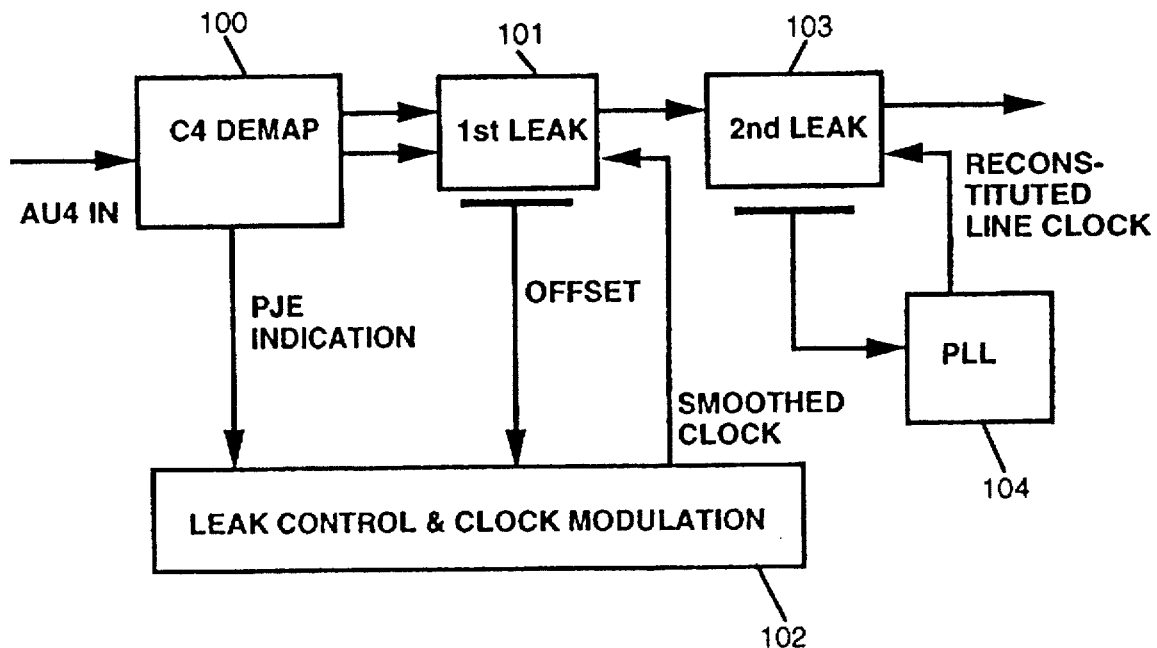
FIG. 2 is a schematic diagram of a desynchroniser arrangement.

Referring now to FIG. 2, the desynchroniser arrangement is disposed at a node of the network of FIG. 1. Information from e.g. a level 4 container is demapped in a demapper 100 and the corresponding information bits are written as they are demapped into a primary leak buffer 101 which is used to store the information extracted from the incoming frame. The information is thus written into this buffer in a bursty manner, using the node clock. The fill of this first buffer 101 will be affected by the gapping due to the framing of the incoming frame as well as by net displacements on the arrival of a pointer justification event. The information stored in the first buffer 101 is read from this buffer using a second gapped clock (smoothed clock) derived from the node clock via a leak control system 102 and is placed in the second leak buffer 103. The second leak buffer 103 is thus fed information in a more continuous manner. The difference between the first and second stage clocks is that in the second stage the framing gaps have been more evenly spread across the frame period. In the presence of pointers, a control system is required to modulate the smoothed clock to increase or decrease its rate and clear the information offset. On arrival of a pointer justification event, the desynchroniser arrangement is given a step input of information, this information being leaked into the second leak buffer over a variable period of time. This second stage leak buffer 104 forms part of an analogue phase locked loop (PLL) 104 used for phase comparison which derives the reconstituted line rate clock. The second buffer leaks information evenly gapped to the analogue phase locked loop which effectively attenuates the high frequency jitter components due to synchronous framing. When a pointer arrives in the leak buffer, the external control 102 modulates the rate at which information is leaked from the first stage leak buffer to account for the extra or deficit information. Previously this leak rate has been either fixed, where external control is not possible, or linearly controlled, where the leak rate is directly proportional to the rate of arrival of pointer justification events. An incoming pointer therefore causes an offset in information in the 1st stage buffer. This offset is leaked into the second stage by modulation of the second gapped clock.

Figure 3:
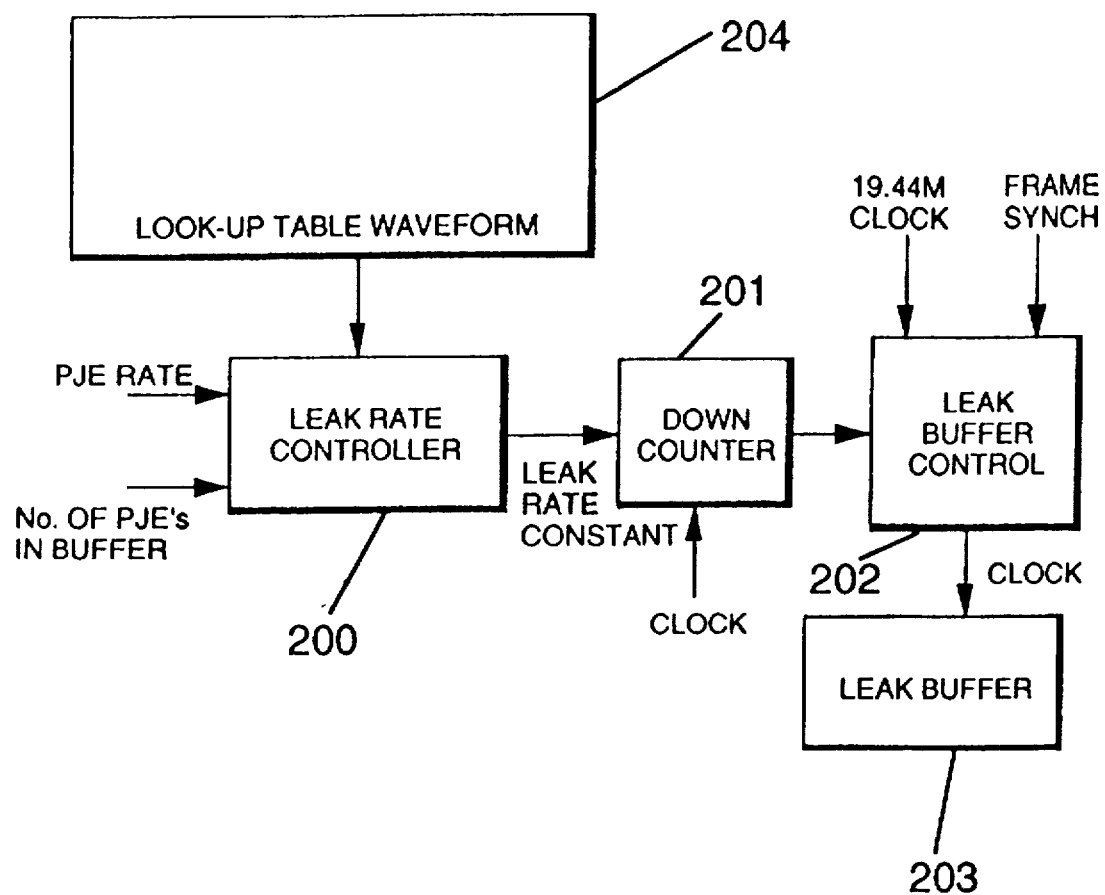
FIG. 3 is a schematic diagram illustrating the operation of the leak rate control system of the desynchroniser of FIG. 2.
Figure 4A:
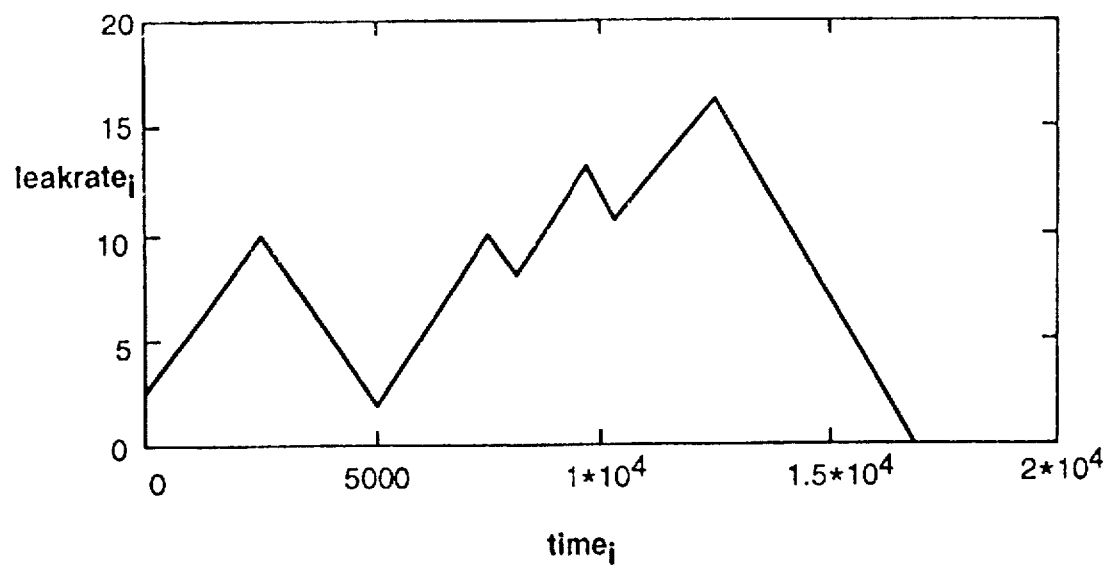
FIGS. 4a and 4b illustrate graphically the manner in which the pointer leak rate and the corresponding pointer fill are controlled by the control system of FIG. 3
Figure 4B:
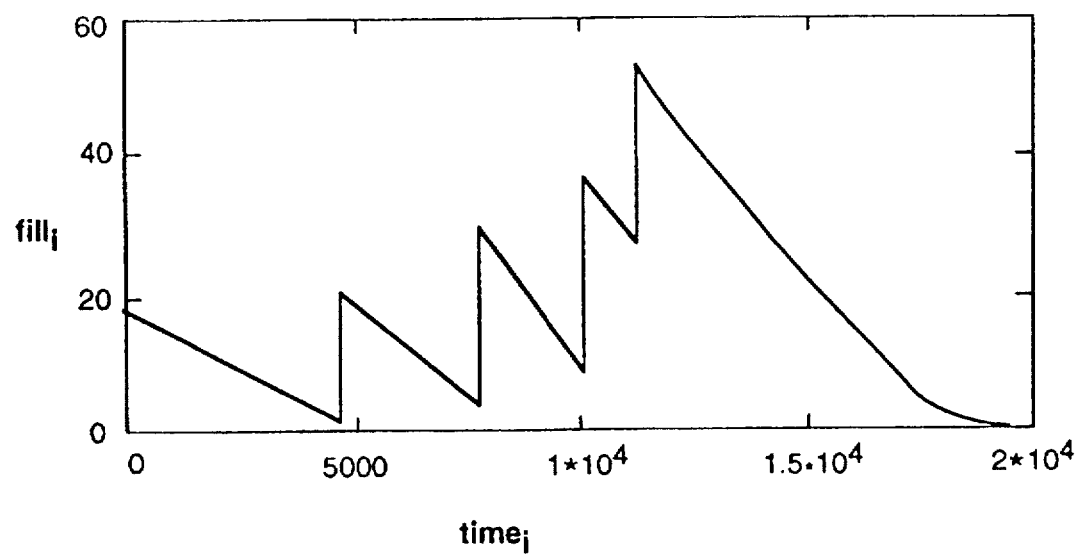

The leak control mechanism will now be described with reference to FIG. 3 which illustrates the process, to FIG. 4a which illustrates the effect of the control process on the leak rate and to FIG. 4b which illustrates the corresponding pointer fill condition.

The process controls the absolute rate of change of leak rate by keeping it constant while increasing or decreasing the leak rate. Thus as the period over which a bit is leaked may be varied, the periods between bits being leaked may be calculated and defined in a lookup table. Thus the system has a leak control software package with a predetermined table of leak periods 204. The desynchroniser hardware is accordingly furnished with interrupts to indicate the arrival of a pointer, the leaking of a bit, and a register to indicate the fill level of the buffer. The hardware receives from the software the leak interval. The exact hardware implementation may be one of a variety of adaptive bit leak mechanisms. In FIG. 3 the lookup table contains a list of intervals between bit leaks which if sequentially used correspond to the desired rate of increase of leak rate. Calculation of these intervals in real time is impractical, so a lookup table is used in a real system.

The control system 200 places the initial condition of minimum leak rate into the leak control register. When a pointer interrupt occurs, the leak timing begins. This is achieved in this example, by loading the leak interval into a down counter 201. This counts down from the interval value a number of clock periods then on crossing the zero threshold, triggers the leak buffer control 202 to leak a bit from the buffer 203. After a bit is latched into the down counter 201, the software increments the rate table to the next interval which corresponds to an increased rate. This is ready to be latched when the previous bit leak occurs.

To illustrate how the control algorithm behaves the fill and leak rate were monitored during a simulation. The graphs shown in FIGS. 4(a) and 4(b) are for a series of pointers. The pointers become gradually more frequent until, at approximately 12 seconds into the simulation, the pointer activity ceases. Note in practice the incoming pointer rate would not drop instantly to zero but would gradually reduce. The sudden change of rate is for illustrative purposes only.

For the initial pointer, the leak rate is gradually increased to a peak rate at approximately 2,500 ms. Thereafter the control system starts to reduce the rate. However before the rate falls to zero an additional pointer arrives. The successively closer pointers result in an increasing leak rate. The increasing leak rate follows the 3.11 bit/s/s gradient. The control system ensures that the leak rate falls to zero at exactly the same time as the buffer fill reaches zero and that there will be no sudden step change in leak rate.

In the graph of leak rate versus time in FIG. 4, the area under the curve equates to the number of bits leaked. Thus the software samples the buffer fill at each bit leak increment to establish the number of bits remaining to be leaked. By calculating the number of bits leaked, the software may decrement the leak rate at the point where the bits remaining to be leaked are equal or less than the bits leaked. This is shown more formally as $$Lr=Mt$$
$$Lrdt=M \int tdt$$

The integral of the leak rate is the amount of information leaked B. Integrating over half the triangular wave period and doubling to cover the area of the symmetrical function gives $$B=M[T]^2$$

where T is the half period of the triangular wave.

In the practical system an integration is unnecessary, as the pointer to the bit leak interval value equates, by offset from the initial value, to the number of bits leaked.

The practical system will require a buffer sizing to allow a broad spectrum of pointer input activity to the system. Where the control system interfaces to an non optimal buffer sized desynchroniser, the control mode must change when the buffer exceeds a threshold fill. This behaviour is necessary to avert the situation where buffer overflow or under flow occurs with synchronisation faults in the network. Accordingly this control system changes to a more conventional mode of operation where the leak rate is determined by the buffer offset. This more responsive system performance remains in place until the buffer fill falls below a threshold to cause reversion to the video control mode. A part of this invention is to produce a status indication to the user of the equipment to show that the desynchroniser has changed to non video mode of operation, thus compromising video service performance if carried.

For example, in the case of the video service described in "The 140 Mbit PAL Video Service" on page 1, M is fixed at 3.1 bits/second. Taking the worst case number of information bits in the system to be cleared on a single PJE as 24 the time required to clear a single pointer may be calculated.

$$T = \sqrt{\frac{B}{M}}$$

giving, in this case, 2.3 second. This needs multiplied by two to cover the waveform symmetry and this shows that PJE is cleared in 4.6 second as opposed to the previous linear control figure which would require 7.7s to clear, at the same rate of jitter transfer into the network.

This technique minimises jitter while maximising the rate at which pointer justification event information is cleared from the desynchroniser buffers. Therefore it has an advantage over the prior art. In particular this invention will tolerate higher PJE arrival rates at lower jitter outputs than the prior art and additionally will tolerate larger bursts of pointers at the same pointer buffer size.

The technique therefore provides a method of leak control which does not allow the rate of increase of leak rate to go above the limit of 3 bits$^{-2}$. The key parameter within this system is the control of the leak rate increase and decrease rather than the absolute rate. With this system a compromise must be reached between desynchroniser buffer sizing and video compatibility. With a large buffer sizing the control system can respond either to large step changes in pointer rates or accept a large burst of pointers from quiescent. However within the boundaries of broader service capabilities, the control system must not allow buffer overflow. Therefore the control system will step outside the rate in extreme conditions to maintain service. In control terms the dynamics of the system can modulate the damping of the control loop. Under normal operation the desynchroniser is damped to 3 bits$^{-2}$ and this is increased under stress conditions. At this point an alarm can be raised to indicate that if the service carried is video the colour sub carrier phase characteristic may have been compromised by the SDH network. This alarm will allow operators to delineate the source of service problems.

I claim:

1. A method of desynchronising pointer information contained in a video signal at the exit of a synchronous transport network to a plesiochronous tributary by controlling the leak rate of a primary buffer in which the pointer information is temporarily stored, the video signal within the synchronous network being conveyed as bits in virtual containers disposed in frames and each said virtual container being identified within a said frame by a respective pointer, the method comprising demapping the video information bits from the synchronous network to the primary buffer at a rate determined by a first clock, the fill of the primary buffer having irregular framing gaps corresponding to those of an incoming frame and displacements corresponding to incoming pointer justification events, deriving a second variable rate clock whose successive periods comprise successive time intervals stored in a look-up table, and leaking video information bits from the first buffer at a variable rate controlled by the second clock into a secondary buffer forming part of an analogue phase locked loop arranged to attenuate high frequency signal components resulting from synchronous framing and to provide a reconstituted clock signal for video information output from said second buffer, the rate of the second clock determining a corresponding increase or decrease of the rate at which said video information bits are leaked from the primary buffer to the secondary buffer so as to compensate for a temporary deficit or surplus respectively of video information bits, and wherein the absolute rate of change at which said bits are leaked from the primary buffer to the secondary buffer is maintained constant during a said increase or decrease of the leak rate.

2. A method according to claim 1 wherein the bit leak rate Lr of the desynchroniser is $$Lr = K \oint Pr \, dt$$

where Pr is the pointer justification arrival rate.

3. An arrangement for desynchronising pointer information contained in a video signal at the exit of a synchronous transport network to a plesiochronous tributary by controlling the leak rate of a primary buffer in which the pointer information is temporarily stored, the video signal within the synchronous network being conveyed as bits in virtual containers disposed in frames and each said virtual container being identified within a said frame by a respective pointer, the arrangement comprising a demapper arranged to demap the video information bits from the synchronous network to the primary buffer at a rate determined by a first clock, the fill of the primary buffer having irregular framing gaps corresponding to those of an incoming frame and displacements corresponding to incoming pointer justification events, a look-up table for storing a set of time intervals, a leak control and clock modulation system arranged to derive from said look-up table a second variable rate clock whose successive periods comprise successive time intervals stored in the look-up table, said leak control system being arranged to leak said demapped video information bits from the first buffer at a variable controlled rate into a secondary buffer forming part of an analogue phase locked loop arranged to attenuate high frequency signal components resulting from synchronous framing and to provide a reconstituted clock signal for video information output from said second buffer, the rate control of the second clock increasing or decreasing the rate at which said video information bits are leaked from the primary buffer to the secondary buffer so as to compensate for a temporary deficit or surplus respectively of video information bits.

4. A sychronous network node desynchroniser incorporating a leak rate control arrangement as claimed in claim 3.

\* \* \* \* \*